(12) United States Patent
Lee et al.

(10) Patent No.: US 10,732,873 B1
(45) Date of Patent: Aug. 4, 2020

(54) TIMEOUT MODE FOR STORAGE DEVICES

(71) Applicant: MICROSOFT TECHNOLOGY LICENSING, LLC, Redmond, WA (US)

(72) Inventors: Scott Chao-Chueh Lee, Bellevue, WA (US); Bryan Stephen Matthew, Seattle, WA (US); Vinod R. Shankar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/388,114

(22) Filed: Apr. 18, 2019

(51) Int. Cl.
*G06F 12/00* (2006.01)
*G06F 3/06* (2006.01)
*G06F 11/14* (2006.01)
*G06F 11/10* (2006.01)

(52) U.S. Cl.
CPC .......... *G06F 3/0635* (2013.01); *G06F 3/061* (2013.01); *G06F 3/0634* (2013.01); *G06F 3/0653* (2013.01); *G06F 3/0655* (2013.01); *G06F 3/0683* (2013.01); *G06F 11/1084* (2013.01); *G06F 11/1471* (2013.01); *G06F 2206/1012* (2013.01)

(58) Field of Classification Search
CPC ...... G06F 3/0635; G06F 3/061; G06F 3/0634; G06F 3/0653; G06F 3/0655; G06F 3/0683; G06F 11/1084; G06F 11/1471; G06F 2206/1012
See application file for complete search history.

(56) References Cited

U.S. PATENT DOCUMENTS

| 7,574,623 B1* | 8/2009 | Goel ..................... G06F 11/008 714/47.2 |
| 8,903,982 B2* | 12/2014 | Nagai ................... G06F 3/0607 709/224 |
| 2012/0259588 A1* | 10/2012 | Nakazawa .......... G06F 11/3476 702/186 |

* cited by examiner

*Primary Examiner* — Shawn X Gu
(74) *Attorney, Agent, or Firm* — Newport IP, LLC; Han Gim

(57) ABSTRACT

A data store is accessed that stores a collected historical record of performance metrics for input/output operations executed at a storage device that is part of a group of storage devices that are configured to provide a fault resiliency function. A performance profile is determined for the selected storage device based on selected performance metrics of the historical record. A difference between the performance profile for the storage device and a characteristic performance profile for similar storage devices is determined. When the difference exceeds a predetermined deviance threshold, selected I/O requests designated for the selected storage device are redirected to another device of the group of storage devices.

20 Claims, 8 Drawing Sheets

TIMEOUT MODE FOR STORAGE DEVICES

BACKGROUND

Data storage devices are susceptible to physical failures, and fault tolerant techniques can be employed to avoid or minimize the impact of such failures. In some examples, physical disk drive components may be combined into one or more logical units to provide data redundancy and performance improvement. Data may also be distributed across the drives depending on the desired level of redundancy, performance, reliability, availability, and capacity. Different levels of resiliency can be achieved, for example, by different mirroring schemes or parity schemes or other types of erasure coding schemes.

In a system with storage devices, a performance issue in a single storage device can lead to performance issues for storage resources that are allocated across multiple storage devices. Some methods attempt to identify failures using specialized and disruptive diagnostics such as installing special firmware or injecting added data traffic, which can cause delays or disruptions and may produce mixed results.

It is with respect to these and other considerations that the disclosure made herein is presented. The subject matter claimed herein is not limited to embodiments that solve any disadvantages or that operate only in environments such as those described above. Rather, this background is only provided to illustrate one exemplary technology area where some embodiments described herein may be practiced.

SUMMARY

It is desirable to provide the highest level of data storage availability and resiliency while at the same time providing performance and minimizing cost. It is also desirable to avoid faults and to take corrective or preemptive action before faults occur. In a system with storage devices, a performance issue in a single storage device can lead to performance issues for storage resources that are allocated across multiple storage devices, for example when mirroring or parity resiliency schemes are implemented. As used herein, such resiliency schemes may also be referred to as a resiliency function or resiliency mechanism.

Some methods attempt to identify failures using specialized and disruptive diagnostics such as installing special firmware or injecting added data traffic, which can cause delays or disruptions and may produce mixed results. Some storage systems attempt to identify faults by measuring the average latency for input/output (I/O) operations to individual storage devices. However, taking the average may mask many performance issues. For example, existing techniques that measure the average latency do not readily identify device failure modes that involve a relatively small number of I/O operations that exhibit excessive latency.

In some cases, devices that are poorly performing may be taken offline and evaluated. This can result in a storage device being unavailable to provide its contribution to the resiliency scheme, which may lead to data loss if additional failures occur. Alternatively, devices may be allowed to continue even if performance is degraded, and may be taken offline only when a hard failure occurs. However, continuing to use a device that is providing degraded performance may cause issues across the entire system. Furthermore, nothing is being done during this time to troubleshoot the issue. If such issues are not identified in a timely manner, downtime and data loss may occur, leading to a poor user experience.

In various embodiments described herein, techniques are disclosed for preventing a storage device from entering a poorly performing state, and allowing for the storage device to recover and continue operation rather than allowing the device to eventually undergo a permanent or hard failure. This can provide advantages to resiliency/redundancy schemes, where storage devices are combined into logical units using mirroring or parity or other erasure coding schemes. Taking a storage device offline or allowing the storage device to enter a poorly performing state may significantly impact the resiliency guarantees associated with such schemes, and thus it would be preferable to leave a device online and available as long as data on the device is valid. For example, a storage device that is exhibiting marginal behavior can continue to be used for writes but read requests can be routed to other devices. By diverting read requests, usage of the poorly performing device may be reduced, allowing for the device to internally recover and eventually resume normal operation.

In another aspect, the disclosure describes a way to predict when a storage device will enter a marginal state, thus allowing for preemptive action before the device actually reaches the marginal state (e.g., before the device fails an I/O request). In one embodiment, when it is determined that a storage device is approaching a marginal state, the throttling mechanism described above may be invoked to modify the timing of I/O requests that are sent to the storage device.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques disclosed herein provide for improvements in the implementation of storage systems. In some embodiments, the storage systems are implemented in data centers and other networked environments, including those that provide virtualized services. The storage systems may include data backup and recovery schemes such as mirroring and parity schemes. The improvements can include improved data resiliency, reduced downtime, and reduced costs.

In some cases, storage devices may exhibit behaviors that prevent optimal performance while falling short of a full device failure. For example, during device maintenance such as garbage collection or bad block remapping, the device may delay responding to I/O requests. In other cases, the device may temporarily stop responding to I/O requests due to other issues that may resolve after some time period, and does not otherwise permanently fail. For example, workload can build up on some devices, resulting in its queue depth being exceeded and performance being degraded. These devices are still working, though undergoing some performance issues.

In such situations, it may be advantageous to allow the device to recover and continue operation rather than having the device considered as a hard failure. For example, when storage devices are combined into logical units to provide data redundancy using mirroring schemes or parity schemes where multiple copies of data or parity copies may be stored on different devices, taking a storage device offline may significantly impact the resiliency guarantees associated with such schemes. It would thus it may be advantageous to leave a device online as long as data on the device is valid. It would also be advantageous to prevent the device from entering a state where performance is marginal.

In one aspect, a device that is exhibiting marginal behavior or approaching such a state may continue to be used for writes but read requests may be routed to other devices. By diverting read requests, usage of the marginal device may be reduced, allowing for the device to internally recover and eventually resume normal operation. In an embodiment, the marginal device may be considered as being in a timeout mode, which can also be referred to as a "penalty box." While the marginal device is in the timeout mode, the marginal device can still be used for write operations in order to maintain a role in its associated mirror or parity group or other erasure coding group.

Figure 1:
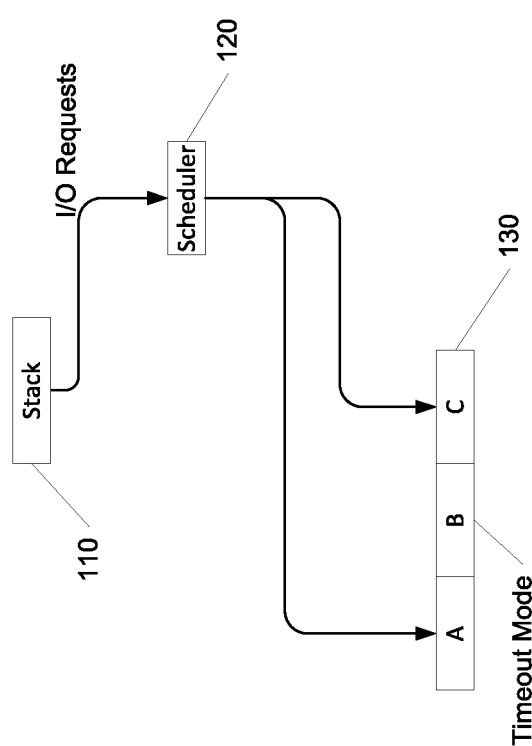
FIG. 1 is a diagram illustrating example a throttling mechanism as disclosed herein.

In an example depicted in FIG. 1, a storage stack 110 may send I/O requests to a scheduler 120 for execution in a storage node 130 that implements a three-way mirroring scheme. Storage device B of the storage node 130 is shown as being placed in timeout mode. While storage device B is in the timeout mode, it may continue to receive write requests. However, when a read request is received by the scheduler 120, the scheduler 120 may send the read requests only to storage device A or storage device C. By continuing to consider storage device B as valid for writes, the overall resiliency guarantees may be considered valid. Since read requests can be fulfilled by storage device A or storage device C (since they both have copies of the requested data), the redirection of read requests to storage device A or storage device C may alleviate the burden on storage device B, allowing the device to complete its pending requests. The redirection of read requests is one example of an I/O operation that may be redirected while a storage device is in the marginal state or in the timeout mode. Other I/O operations may also be redirected, where the redirection would not cause a negative impact to resiliency objectives.

In some embodiments, a storage device may be identified as approaching or being in a marginal state based on various factors. In one embodiment, a storage device may be identified as approaching or being in a marginal state when an I/O operation is not completed within a threshold amount of time. As used herein, when a device is determined to be approaching a marginal state, the device may be considered in a "pre-marginal" state. The threshold amount of time may be, for example, six seconds. The storage device may not be marked as failed until the device repeatedly fails to respond to I/O requests, for example by failing to respond within a time limit beyond which it would be considered unlikely to respond even if given more time (e.g., the device has failed to respond to the last three requests, or the device has not responded for 10 minutes). When the device is considered as pre-marginal or marginal, subsequent read requests may be redirected to the other devices. Resiliency guarantees can be maintained since all devices are still valid. When read requests for a pre-marginal or marginal device is redirected to the devices, the device may be considered as being in the timeout mode.

A storage device may be kept in the timeout mode in accordance with data center policies. The data center policies may be based on operational objectives, efficiency objectives, service agreements with users, and other factors. The data center policies may consider how long a device should be kept in the timeout mode, and under what other criteria the device may exit the timeout mode and resume normal operation. In one example, read attempts may be periodically sent to the marginal device, for example every five minutes, to determine if the device has resumed normal operation.

In another aspect, the disclosure describes a way to predict when a storage device is in a pre-marginal state, before the device actually reaches the marginal state (e.g., before the device fails an I/O request). In one embodiment, when it is determined that a storage device is approaching a marginal state, a throttling mechanism may be invoked to modify the timing of I/O requests that are sent to the storage device. When a storage device is to be throttled, the I/O scheduling function may move some read requests to other devices, increasing the time between read requests, or redirect all read requests to other devices. This may be performed even when the other devices have large I/O queues, since the I/O requests will more likely be completed by the overloaded but operational devices than by the pre-marginal or marginal storage device.

In some embodiments, I/O queues may be analyzed to avoid queue build-up and thus avoid one possible cause for storage devices entering the marginal state. When a storage device experiences queue build-up, the continuing addition of tasks to the queue may prevent the storage device from completing and clearing its pending tasks. In one example, some devices such as non-volatile memory express (NVMe) devices may provide expected time estimates for requested operations. The estimates may be used to determine if the requests should be re-routed to other devices when the estimates indicate that the time estimate approaches a threshold time. In another example, a storage device can be determined to be at risk of being in a pre-marginal or marginal state when a percentage of I/O operations exceed a specified latency for a given time duration.

In an embodiment, distributed I/O latency and other time-based and distributed behavioral and characteristic data may be used to predict if a storage device will enter a pre-marginal or marginal state and therefore should be preemptively placed in the timeout mode. By anticipating when a device should be placed into the timeout mode, the system can take preventative actions to reduce the likelihood that the device actually enters the timeout mode or enters a failed state, which enables the reduction of downtime and potential data loss.

The average latency for I/O operations on individual storage devices may be used to identify potential issues. However, taking the average may mask some potential performance issues. For example, existing techniques that measure the average latency do not readily identify device failure modes that involve a relatively small number of I/O operations that exhibit excessive latency.

In an embodiment, the distribution of I/O latency and other performance characteristics for a given storage device may be used to identify potential device issues. The distribution of I/O latency may be based on time or other bases. For example, tail latencies, or higher percentile latencies, may be used to identify potential device issues. A comparison may be performed of the I/O latency distribution for a storage device to data from other storage devices in the same class to identify whether the storage device is entering a pre-marginal or marginal state. The distribution of I/O latency and other performance characteristics may be used to determine a performance profile for storage device. When the performance profile is determined based on I/O performance information, then the performance profile may be referred to as a time-based I/O performance profile.

The distributed I/O latency and other time-based data may also be used to predict pre-marginal or marginal storage device states and other device states. The prediction may be made based on observable characteristics before substantial I/O response delays and other problematic behaviors manifest.

The time-based distributed data can be referred to herein as distributed behavioral and characteristic data. The distributed behavioral and characteristic data can be used to identify outlying or deviant behavior as compared to other devices within the same class or grouping. For example, such devices may be considered in the same class or grouping based on being made by the same manufacturer, having similar technical specifications such as storage capacity and I/O speeds, built within a specified time period, and the like. For example, a device with a latency profile that is statistically deviant compared to a characteristic profile for other devices of the same class or grouping can indicate a high probability that the device should be placed in timeout mode within a threshold period of time. The failure probability can be adjusted based on actual observed failures. For example, if a machine learning function is used to learn and identify pre-marginal behavior, then the behaviors of a failed device before the device failed may be used to further improve the training of the machine learning function.

The behavioral and characteristic data can include the time distribution of I/O latencies as well as other data that can be readily observable or self-reported. Such data can include failure and maintenance data, device temperature, and I/O queue time. The behavioral and characteristic data can be collected across entire populations of devices at the same or across data centers. Characteristic patterns can then be identified that are indicative of potential device issues for various classes of devices, allowing for devices to preemptively be placed in timeout mode. In this way, delayed responses from devices that are marginal can be avoided, thus avoiding delays, downtime, failures, and possible data loss. The decision to place devices preemptively in timeout mode may further be based on additional factors such as quality of service (QoS) factors. For example, network bandwidth objectives, load balancing objectives, or other QoS objectives may dictate that some devices are placed in timeout mode in addition to or in lieu of the behavioral and characteristic data.

In one embodiment, the characteristic profiles may be developed until they are relatively deterministic with respect to a performance issue for a given parameter and for a given class or type of device. The distribution of I/O latency and other performance characteristics may be used to determine a characteristic performance profile for the given class or type of device. When the characteristic performance profile is determined based on I/O performance information, then the characteristic performance profile may be referred to as a characteristic time-based I/O performance profile.

The measurements may be analyzed using various methods, such as standard deviation or a time-based graph. By comparing the profile of a given device with the characteristic profiles, a status of the device may be determined, such as determining when and if the resource will enter into a pre-marginal or marginal state. In some embodiments, a difference between the time-based I/O performance profile for the storage device and the characteristic time-based I/O performance profile may be determined. The difference may be referred to as a deviance or a performance deviance. When the difference between the time-based I/O performance profile for the storage device and the characteristic time-based I/O performance profile exceeds a threshold, then the storage device may be considered as being in a pre-marginal state. This threshold may be referred to as a deviance threshold or a predetermined deviance threshold. The threshold may be determined based on an analysis of historical data when devices have previously entered the pre-marginal state. The threshold may further be determined based on heuristics as well as machine learning. The threshold may be a single value, a range of values, or may be represented in other ways such as a table, graph, or a function.

When the difference exceeds the predetermined deviance threshold, selected I/O requests designated for the storage device may be redirected to another device of a group of storage devices that are providing a resiliency function. The selected I/O requests may be redirected for a timeout period, or until the difference no longer exceeds the threshold. The timeout period may be determined based on a characteristic recovery time for the storage device. The characteristic recovery time may be determined based on an analysis of historical data when devices have previously recovered the pre-marginal state. The characteristic recovery time may further be determined based on heuristics as well as machine learning. The characteristic recovery time may be a single value or a range of values. The characteristic recovery time may be continuously updated as new data becomes available.

Figure 2:
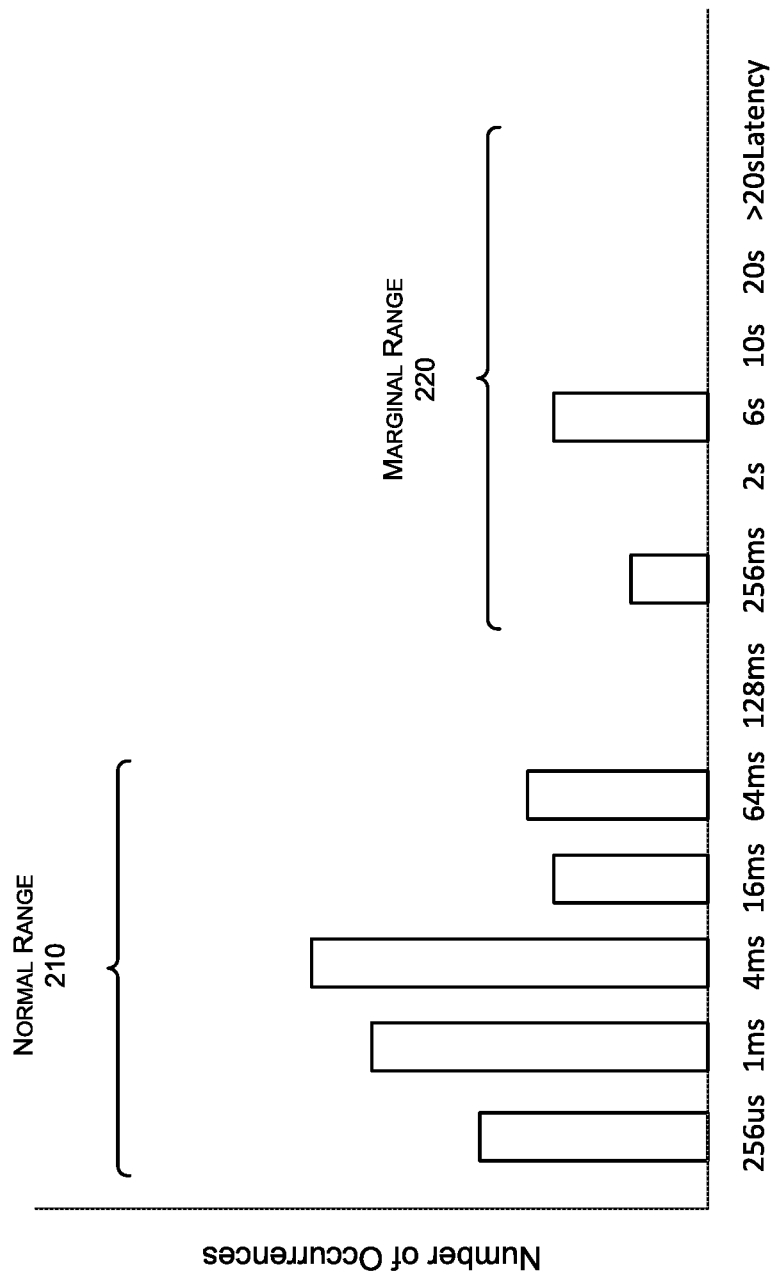
FIG. 2 is a diagram illustrating an example of determining marginal performance, according to the described implementations.

In the example illustrated in FIG. 2, a distribution of latencies for a selected storage device is depicted. The vertical axis shows the number of occurrences, and the horizontal axis shows the distribution of recorded latencies. FIG. 2 illustrates a normal range 210 that indicates I/O responses that are considered within the normal range of response times for operations during a typical operational environment. The figure also illustrates a marginal range 220 that indicates I/O responses that are considered within a range that is predictive of response times for operations that are pre-marginal or marginal.

Figure 3:
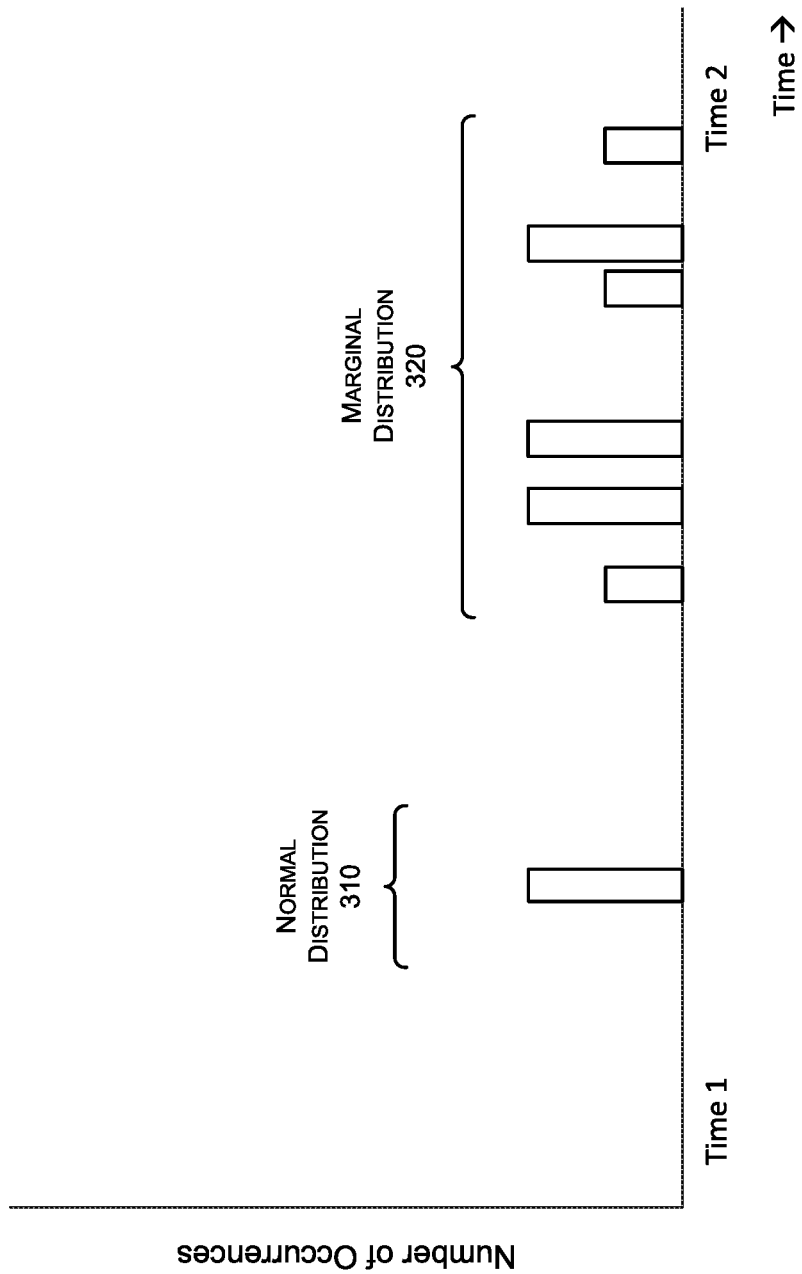
FIG. 3 is a diagram illustrating an example of determining marginal performance, according to the described implementations.

In the example illustrated in FIG. 3, a time-based distribution of latencies for a selected storage device that have exceeded a specified latency threshold is depicted. The vertical axis shows the number of occurrences of latencies that have exceeded 2 seconds, and the horizontal axis shows the distribution of recorded latencies over a specified time period. FIG. 3 illustrates a normal distribution 310 that indicates I/O responses that are considered within the normal range where some number of higher latencies may have occurred during a peak usage time for operations during a typical operational environment. The figure also illustrates a marginal distribution 320 that indicates a larger number of I/O responses that occurred within a time period that are considered within a range that is predictive of pre-marginal or marginal behavior.

Figure 4:
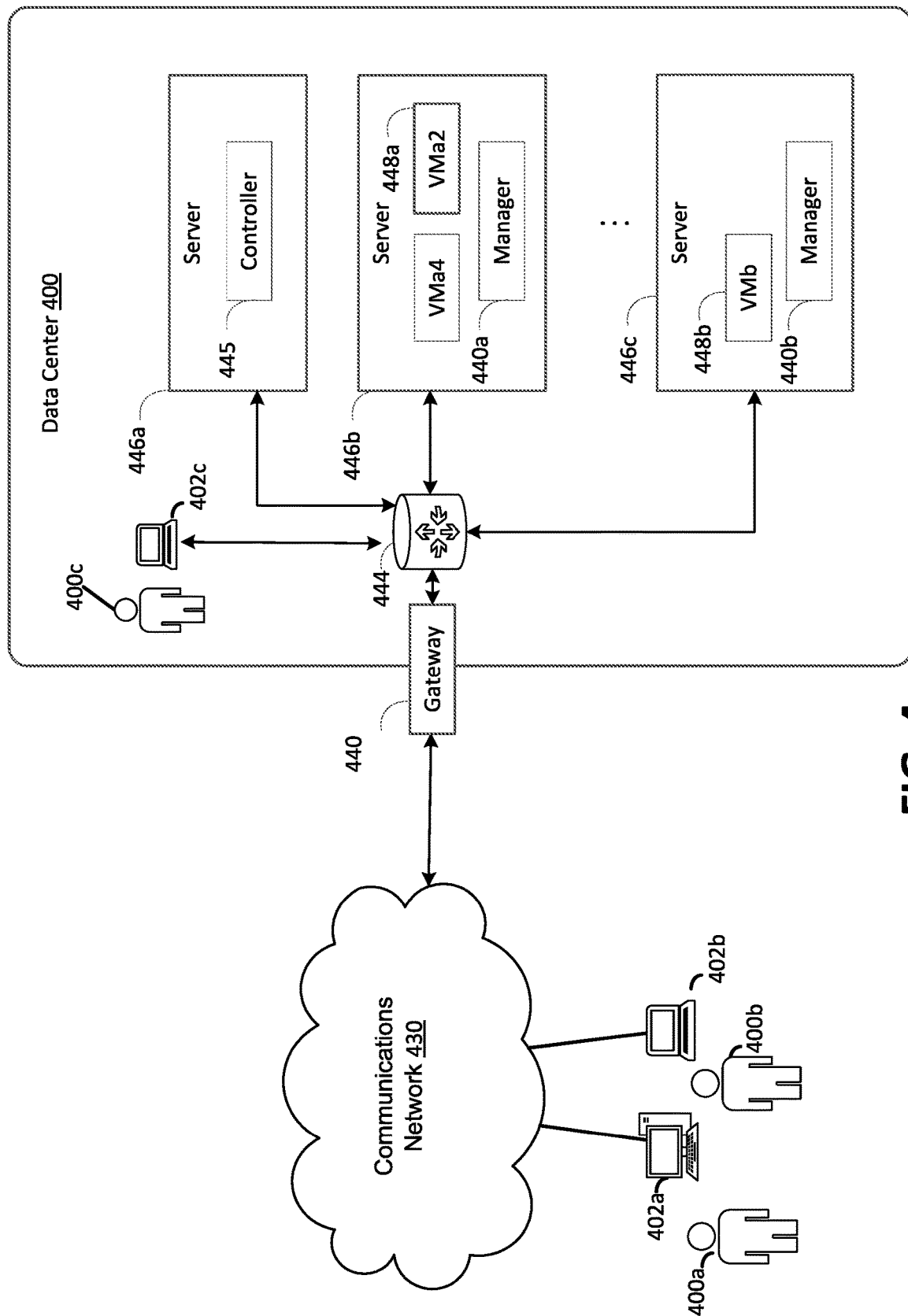
FIG. 4 is a diagram illustrating an example system where aspects of the disclosure can be implemented.

FIG. 4 illustrates an example computing environment in which the embodiments described herein may be implemented. FIG. 4 illustrates a data center 400 that configured to provide computing resources to users 400a, 400b, or 400c (which may be referred herein singularly as "a user 400" or in the plural as "the users 400") via user computers 402a, 402b, and 402c (which may be referred herein singularly as "a computer 402" or in the plural as "the computers 402") via a communications network 430. The computing resources provided by the data center 400 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 400 may include servers 446a, 446b, and 446c (which may be referred to herein singularly as "a server 446" or in the plural as "the servers 446") that provide computing resources available as virtual machines 448a and 448b (which may be referred to herein singularly as "a virtual machine 448" or in the plural as "the virtual machines 448"). The virtual machines 448 may be configured to execute applications such as Web servers, application servers, media servers, database servers, and the like. Other resources that may be provided include data storage resources (not shown on FIG. 4) and may include file storage devices, block storage devices, and the like. Servers 446 may also execute functions that manage and control allocation of resources in the data center, such as a controller 445. Controller 445 may be a fabric controller or another type of program configured to manage the allocation of virtual machines on servers 446.

Referring to FIG. 4, communications network 430 may, for example, be a publicly accessible network of linked networks and may be operated by various entities, such as the Internet. In other embodiments, communications network 430 may be a private network, such as a corporate network that is wholly or partially inaccessible to the public.

Communications network 430 may provide access to computers 402. Computers 402 may be computers utilized by users 400. Computer 402a, 402b or 402c may be a server, a desktop or laptop personal computer, a tablet computer, a smartphone, a set-top box, or any other computing device capable of accessing data center 400. User computer 402a or 402b may connect directly to the Internet (e.g., via a cable modem). User computer 402c may be internal to the data center 400 and may connect directly to the resources in the data center 400 via internal networks. Although only three user computers 402a, 402b, and 402c are depicted, it should be appreciated that there may be multiple user computers.

Computers 402 may also be utilized to configure aspects of the computing resources provided by data center 400. For example, data center 400 may provide a Web interface through which aspects of its operation may be configured through the use of a Web browser application program executing on user computer 402. Alternatively, a stand-alone application program executing on user computer 402 may be used to access an application programming interface (API) exposed by data center 400 for performing the configuration operations.

Servers 446 may be configured to provide the computing resources described above. One or more of the servers 446 may be configured to execute a manager 420a or 420b (which may be referred herein singularly as "a manager 420" or in the plural as "the managers 420") configured to execute the virtual machines. The managers 420 may be a virtual machine monitor (VMM), fabric controller, or another type of program configured to enable the execution of virtual machines 448 on servers 446, for example.

It should be appreciated that although the embodiments disclosed above are discussed in the context of virtual machines, other types of implementations can be utilized with the concepts and technologies disclosed herein. For example, the embodiments disclosed herein might also be utilized with computing systems that do not utilize virtual machines.

In the example data center 400 shown in FIG. 4, a router 444 may be utilized to interconnect the servers 446a and 446b. Router 444 may also be connected to gateway 440, which is connected to communications network 430. Router 444 may manage communications within networks in data center 400, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 400 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 5:
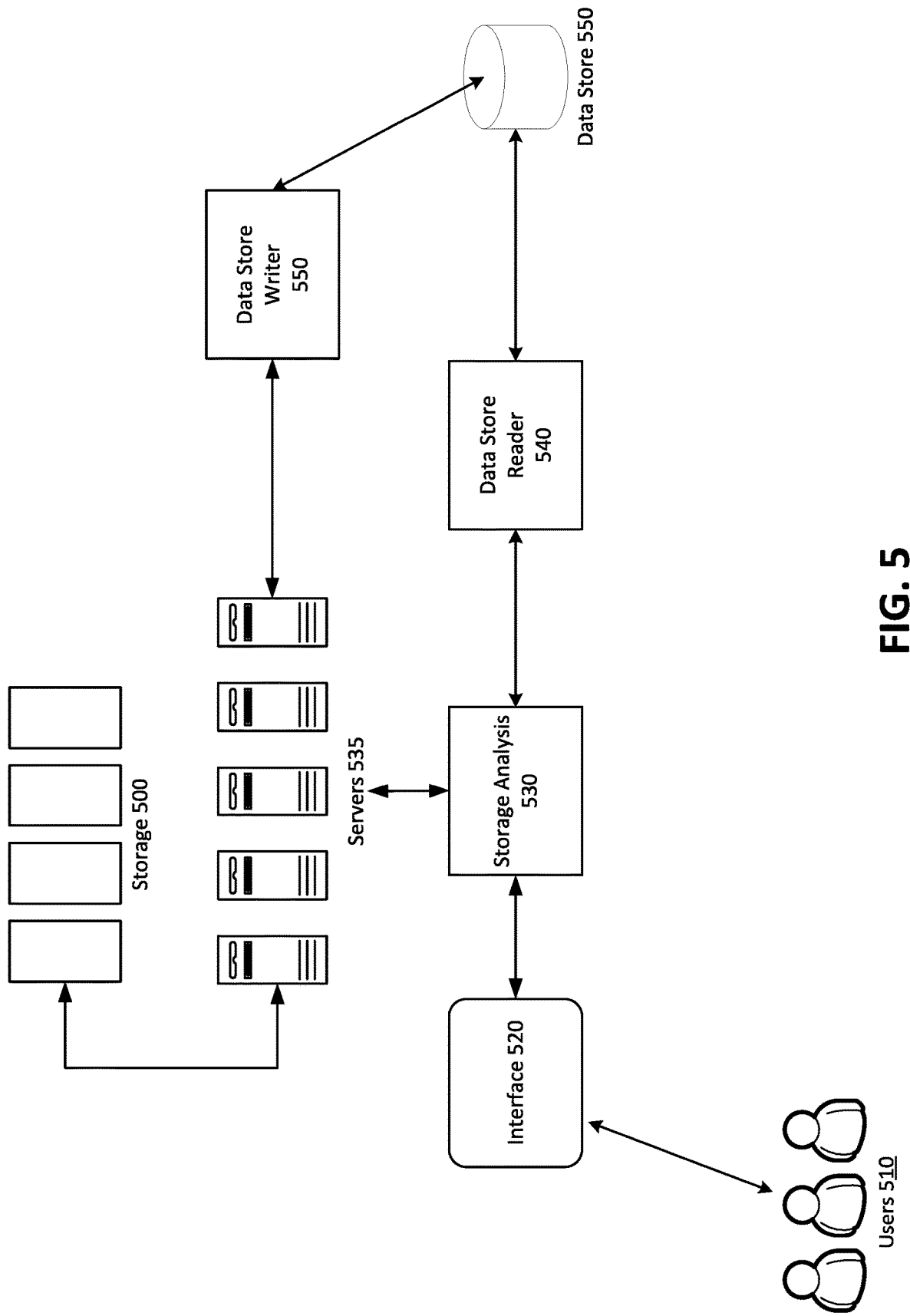
FIG. 5 is a diagram illustrating an example system where aspects of the disclosure can be implemented.

FIG. 5 is a diagram illustrating a storage analysis engine 530 that is configured to identify pre-marginal or marginal performance issues in accordance with the present disclosure. In FIG. 5, a storage system may include resources and applications that may execute, for example, on one or more servers 535. For example, a storage scheduler may operate on one or more servers 535. FIG. 5 also illustrates storage devices 500 that are managed by the storage scheduler and other applications running on servers 535. It will be appreciated that some embodiments may involve additional computing resources of various types that may be provided in a storage system.

FIG. 5 also illustrates an interface 520 that may provide access for one or more computers accessible by users 510 that may include administrators and other users. According to one embodiment, resources executing on servers 535 may be configured to provide storage services to users 510 via a network (not shown in FIG. 5). FIG. 5 also illustrates a data store 550 that may store data pertaining to various events and metrics for storage devices 500.

A request may be sent to storage analysis engine 530 for monitoring and analyzing one or more storage devices 500. The storage analysis engine 530 may be co-hosted with the servers 535, or may reside on devices of users 510, or a combination thereof. In some embodiments, a request may be received from a device of one of the users 510 for analysis of the storage devices 500. In other embodiments, the request may be received from one or more applications running on servers 535. In response to receipt of the request, storage analysis engine 530 may log the request and provide updates as to the status of the request. The storage analysis engine 530 may communicate with other services and applications to facilitate: (1) processing of the request, (2) collection of data pertaining to request, and (5) generating interfaces to provide results of the request. The storage analysis engine 530 may, for example, provide an interface for facilitating submission of the request. The storage analysis engine 530 may further provide an interface for viewing the results of the request and modifying or cancelling the request.

Storage analysis 530 may be configured to provide analysis and diagnostics for predicting and detecting pre-marginal and marginal conditions for storage devices 500 based on real time or accumulated and/or archived monitoring of the storage devices 530. The storage analysis engine 530 may access metrics, such as device type and device usage activity. The storage analysis engine 530 may be made accessible via an application programming interface (API) or a user interface that may be accessed via a Web browser or other input mechanisms.

In some embodiments, an expert system that utilizes logical inferences based on available information may be used. An expert system may take available information pertaining to actual failures of devices and use the information as input to a rules-based system to generate updated event probabilities. The available information may be provided to, for example, a Bayesian process to determine an updated probability for the event.

Within this operating environment, storage analysis engine 530 may determine a probability of a pre-marginal or marginal condition. Storage analysis engine 530 may gather data from other components of the operating environment, such as data store 550. Data store 550 may collect information for I/O operations performed by storage devices 500, among other data. A data store writer 550 may be configured to collect and store data at data store 550. A data store reader 540 may be configured to read data from data store 550 and make the data available to storage analysis engine 530. The storage analysis engine 530 may also collect information stored in log files and other locations that may be available from servers 535. The information may also be obtained by querying devices for data that is not currently being stored in a log file.

After a probability has been calculated, a decision as to whether an alert should be sent to the users 510 or if a device should be identified as pre-marginal or marginal may be determined. In some embodiments, a probability analysis may be performed based on machine learning via a machine learning system that includes one or more learning functions that learns the probabilities associated with the availability of various data that may be relevant to the determination of an event probability. This probability analysis may also be performed based on history data of prior probability analyses, or performed based on a user indication of a rule to be used in the probability calculation.

In some embodiments, the storage analysis engine 530 may monitor failures and device attributes automatically. For example, the storage analysis engine 530 may monitor a number of pre-selected events collected or determined at a predetermined frequency. Additional event data may be collected at the same or different frequencies as specified by the storage analysis engine 530.

Additionally, the storage analysis engine 530 may provide users with the ability to request and receive notifications or to take specified actions depending on the detected or predicted events. For example, the storage analysis engine 530 may send a message to one of the users 510.

In some embodiments, an API or a programming interface may be provided for facilitating the submission of event prediction requests. The API may be configured to receive electronic messages that encode identifiers indicative of a failure prediction request for fulfillment by the storage analysis engine 530. In response to receiving one of the electronic messages, the API may send second electronic messages indicative of information indicating that prediction request has been received and may provide the results of the prediction calculation.

The storage analysis engine 530 may provide a detailed analysis and summary of results to a requesting user. For example, the API can be called with information such as a device identifier and specified event. After the API is called, in one embodiment the storage analysis engine 530 may take actions such as:

Access previous data for the device.
Retrieve data of related devices.
Call available APIs that can provide metrics for the devices.
Invoke a probability determination function to generate a predicted probability of pre-marginal or marginal performance.

Using the gathered information, the storage analysis engine 530 may analyze the data, combine or aggregate the data or extract portions of the data as appropriate, and invoke a probability determination function to generate the predicted probability of pre-marginal or marginal performance. The determined probability may be reported through the API along with details regarding potential causes for the event prediction.

When a user is initiating a request for a pre-marginal or marginal performance prediction, the API may return metadata about the device associated with the request. A request identifier may be generated to track and process the request.

In some embodiments, attributes of the device can be selected based on biasing to identify attributes that may have greater impact on the probability calculation. For example, data for an initial set of attributes can be weighted to indicate relevance of the attributes to the failure. The weighting can be continuously updated to increase the accuracy of the biasing.

Figure 6:
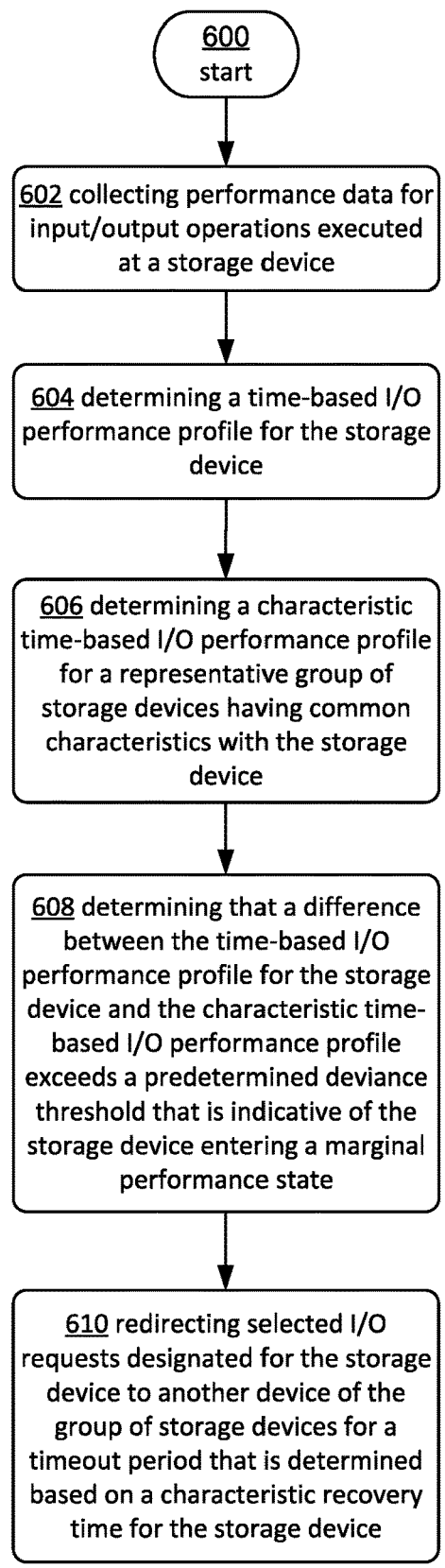
FIG. 6 is a diagram illustrating an example operational procedure, according to the described implementations.

Referring to FIG. 6, illustrated is an example operational procedure in accordance with the present disclosure. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by modules running the features disclosed herein and can be a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine may be also implemented in many other ways. For example, the routine may be implemented, at least in part, by a processor of another remote computer or a local circuit. In addition, one or more of the operations of the routine may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Referring to FIG. 6, Operation 600 begins the procedure. Operation 600 may be followed by Operation 602. Operation 602 illustrates collecting performance data for input/output operations executed at a storage device of a group of storage devices that are configured to implement a fault resiliency function. Operation 602 may be followed by Operation 604. Operation 604 illustrates based on the collected performance data, determining a time-based I/O performance profile for the storage device. Operation 604 may be followed by Operation 606. Operation 606 illustrates determining a characteristic time-based I/O performance profile for a representative group of storage devices having common characteristics with the storage device. Operation 606 may be followed by Operation 608. Operation 608 illustrates determining that a difference between the time-based I/O performance profile for the storage device and the characteristic time-based I/O performance profile exceeds a predetermined deviance threshold that is indicative of the storage device entering a marginal performance state. Operation 608 may be followed by Operation 610. Operation 610 illustrates in response to determining that the difference exceeds the predetermined deviance threshold, redirecting selected I/O requests designated for the storage device to another device of the group of storage devices for a timeout period that is determined based on a characteristic recovery time for the storage device. The characteristic recovery time may be determined based on historical recovery times for the representative group of storage devices.

Figure 7:
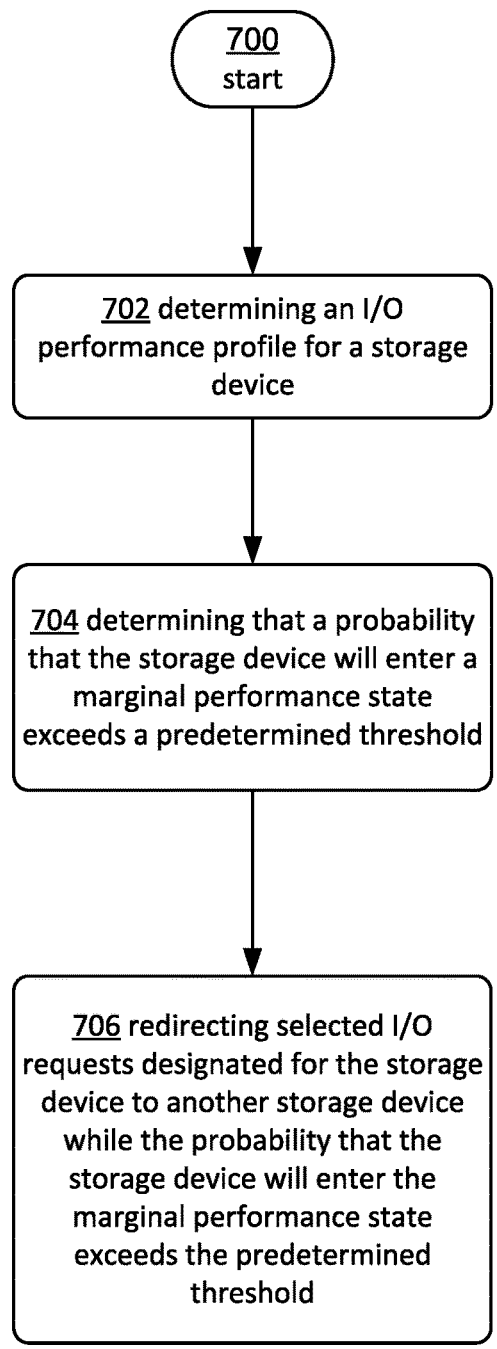
FIG. 7 is a diagram illustrating an example operational procedure, according to the described implementations.

Referring to FIG. 7, illustrated is an example operational procedure in accordance with the present disclosure. Referring to FIG. 7, Operation 700 begins the procedure. Operation 700 may be followed by Operation 702. Operation 702 illustrates determining an I/O performance profile for a storage device, the I/O performance profile determined based on one or more performance metrics for the storage device. Operation 702 may be followed by Operation 704.

Operation 704 illustrates based on the I/O performance profile and a characteristic I/O performance profile for a representative group of storage devices having common characteristics with the storage device, determining that a probability that the storage device will enter a marginal performance state exceeds a predetermined threshold. Operation 704 may be followed by Operation 706. Operation 706 illustrates redirecting selected I/O requests designated for the storage device to another storage device while the probability that the storage device will enter the marginal performance state exceeds the predetermined threshold.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the described methods are described herein as being implemented, at least in part, by system components, which can comprise an application, component and/or a circuit. In some configurations, the system components include a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of FIG. 1-10, it can be appreciated that the operations of the described methods may be also implemented in many other ways. For example, the methods may be implemented, at least in part, by a processor of another remote computer or a local circuit. In addition, one or more of the operations of the methods may alternatively or additionally be implemented, at least in part, by a chipset working alone or in conjunction with other software modules. Any service, circuit or application suitable for providing the techniques disclosed herein can be used in operations described herein.

Figure 8:
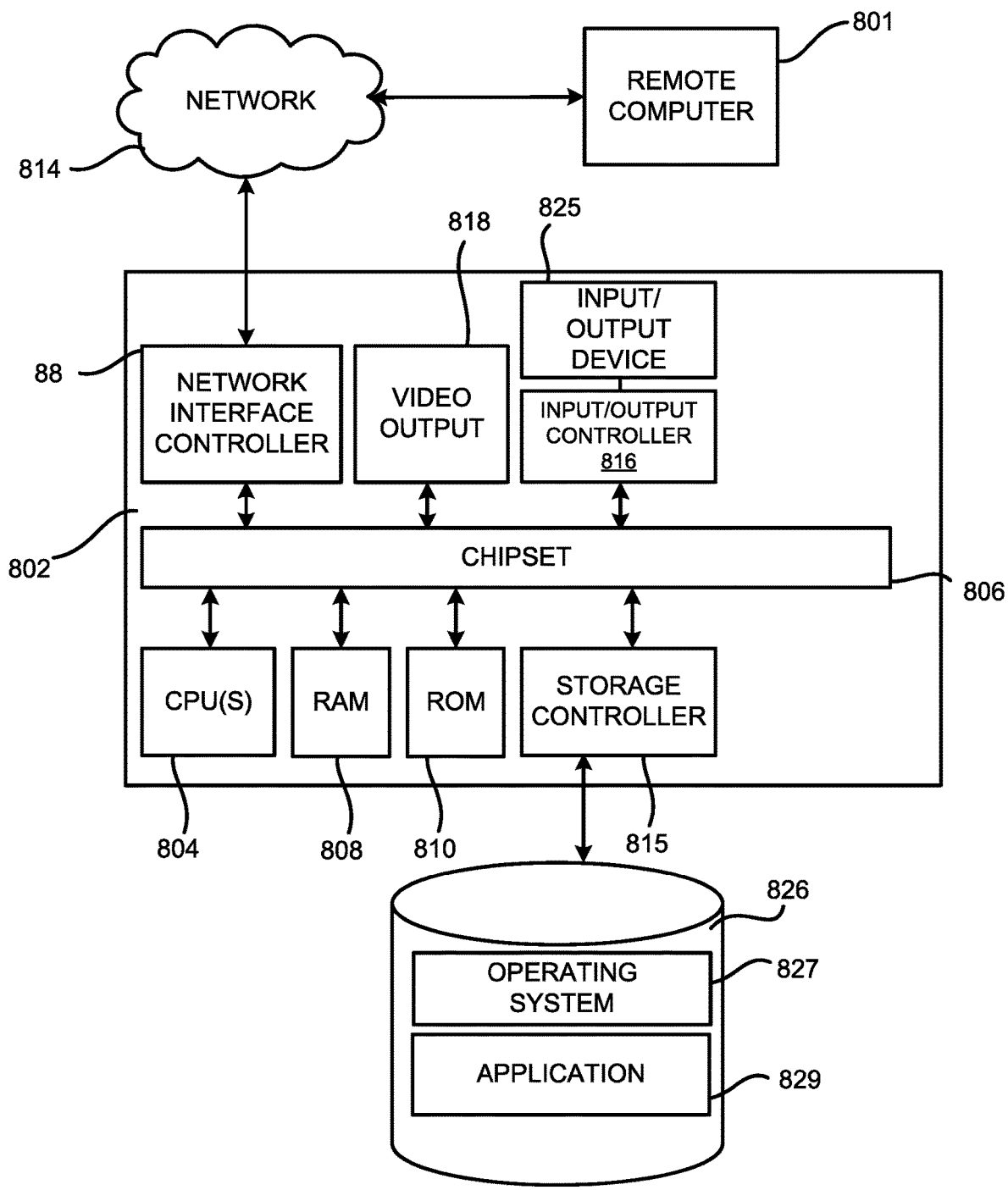
FIG. 8 is a computer architecture diagram illustrating a computing device architecture for a computing device capable of implementing aspects of the techniques and technologies presented herein.

FIG. 8 shows additional details of an example computer architecture capable of various aspects of the embodiments described above. The computer architecture shown in FIG. 8 illustrates aspects of a system, such as a conventional server computer, workstation, desktop computer, laptop, tablet, computing or processing systems embedded in devices (such as wearables, automobiles, home automation etc.), or other computing device, and may be utilized to execute any of the software components presented herein. For example, the computer architecture shown in FIG. 8 may be utilized to execute any of the software components described above.

The computer architecture includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computer architecture.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer architecture. The chipset 806 may further provide an interface to a computer-readable storage medium such as a read-only memory ("ROM") 810 or non-volatile RAM ("NVRAM") for storing basic routines that help to startup the computing device and to transfer information between the various components and devices. The ROM 810 or NVRAM may also store other software components necessary for the operation of the computer architecture in accordance with the embodiments described herein.

The computer architecture may operate in a networked environment using logical connections to remote computing devices and computer systems through a network 814, such as the local area network. The chipset 806 may include functionality for providing network connectivity through a network interface controller (NIC) 88, such as a gigabit Ethernet adapter. The NIC 88 is capable of connecting the computer architecture to other computing devices over the network 814. It should be appreciated that multiple NICs 88 may be present in the computer architecture, connecting the computer to other types of networks and remote computer systems. The network allows the computer architecture to communicate with remote services and servers, such as the remote computer 801. As can be appreciated, the remote computer 801 may host a number of services such as the XBOX LIVE gaming service provided by MICROSOFT CORPORATION of Redmond, Wash. In addition, as described above, the remote computer 801 may mirror and reflect data stored on the computer architecture and host services that may provide data or processing for the techniques described herein.

The computer architecture may be connected to a mass storage device 826 that provides non-volatile storage for the computing device. The mass storage device 826 may store system programs, application programs, other program modules, and data, which have been described in greater detail herein. The mass storage device 826 may be connected to the computer architecture through a storage controller 815 connected to the chipset 806. The mass storage device 826 may consist of one or more physical storage units. The storage controller 815 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 826, other storage media and the storage controller 815 may include MultiMediaCard (MMC) components, eMMC components, Secure Digital (SD) components, PCI Express components, or the like.

The computer architecture may store data on the mass storage device 826 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 826 is characterized as primary or secondary storage, and the like.

For example, the computer architecture may store information to the mass storage device 826 by issuing instructions through the storage controller 815 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture may further read information from the mass storage device 826 by detecting the physical states or characteristics of one or more particular locations within the physical storage units.

In addition to the mass storage device 826 described above, the computer architecture may have access to other computer-readable media to store and retrieve information, such as program modules, data structures, or other data. As the operating system 827, the application 829, other data and other modules are depicted as data and software stored in the mass storage device 826, it should be appreciated that these components and/or other modules may be stored, at least in part, in other computer-readable storage media of the computer architecture. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture. For purposes of the claims, the phrase "computer storage medium," "computer-readable storage medium," and variations thereof, does not include waves or signals per se and/or communication media.

The mass storage device 826 may store an operating system 827 utilized to control the operation of the computer architecture. According to one embodiment, the operating system comprises a gaming operating system. According to another embodiment, the operating system comprises the WINDOWS® operating system from MICROSOFT Corporation.

According to further embodiments, the operating system may comprise the UNIX, ANDROID, WINDOWS PHONE or iOS operating systems, available from their respective manufacturers. It should be appreciated that other operating systems may also be utilized. The mass storage device 826 may store other system or application programs and data utilized by the computer architecture, such as any of the other software components and data described above. The mass storage device 826 might also store other programs and data not specifically identified herein.

In one embodiment, the mass storage device 826 or other computer-readable storage media is encoded with computer-executable instructions which, when loaded into the computer architecture, transform the computer from a general-purpose computing system into a special-purpose computer capable of implementing the embodiments described herein. These computer-executable instructions transform the computer architecture by specifying how the CPUs 804 transition between states, as described above. According to one embodiment, the computer architecture has access to computer-readable storage media storing computer-executable instructions which, when executed by the computer architecture, perform the various routines described above with regard to FIG. 8, and the other FIGURES. The computing device might also include computer-readable storage media for performing any of the other computer-implemented operations described herein.

The computer architecture may also include one or more input/output controllers 816 for receiving and processing input from a number of input devices, such as a keyboard, a mouse, a microphone, a headset, a touchpad, a touch screen, an electronic stylus, image processing and gesture recognition devices, or any other type of input device. The input/output controller 816 is in communication with an input/output device 825. The input/output controller 816 may provide output to a display, such as a computer monitor, a flat-panel display, a digital projector, a printer, a plotter, or other type of output device. The input/output controller 816 may provide input communication with other devices such as a microphone, a speaker, game controllers and/or audio devices.

For example, the input/output controller 816 can be an encoder and the input/output device 825 can include a full speaker system having a plurality of speakers. The encoder can use a spatialization technology, and the encoder can process audio output audio or output signals received from the application 829. The encoder can utilize a selected spatialization technology to generate a spatially encoded stream that appropriately renders to the input/output device 825.

The disclosure presented herein may be considered in view of the following clauses. Example Clause A, a computer-implemented method for predicting a marginal performance state of a storage device, the method comprising:

collecting performance data for input/output operations executed at a storage device of a group of storage devices that are configured to implement a fault resiliency function;

based on the collected performance data, determining a time-based I/O performance profile for the storage device;

determining a characteristic time-based I/O performance profile for a representative group of storage devices having common characteristics with the storage device;

determining that a difference between the time-based I/O performance profile for the storage device and the characteristic time-based I/O performance profile exceeds a predetermined deviance threshold that is indicative of the storage device entering a marginal performance state; and in response to determining that the difference exceeds the predetermined deviance threshold, redirecting selected I/O requests designated for the storage device to another device of the group of storage devices for a timeout period that is determined based on a characteristic recovery time for the storage device.

Example Clause B, the computer-implemented method of Example Clause A, wherein the group of storage devices is an erasure coding group or a group of mirrored devices.

Example Clause C, the computer-implemented method of any one of Example Clauses A through B, wherein the collected performance data comprises latencies for I/O operations that were executed at the storage device.

Example Clause D, the computer-implemented method of any one of Example Clauses A through C, wherein the performance profile comprises a distribution of numbers of metrics that fell within each of a plurality of metric ranges.

Example Clause E, the computer-implemented method of any one of Example Clauses A through D, wherein the performance profile comprises a total number of I/O operations where associated latencies were greater than a threshold.

Example Clause F, the computer-implemented method of any one of Example Clauses A through D, wherein the redirecting selected I/O requests is further based on one or more of bandwidth criteria, device self-reporting, and quality of service factors.

Example Clause G, a computing device comprising:
one or more processors;
a memory in communication with the one or more processors, the memory having computer-readable instructions stored thereupon which, when executed by the one or more processors, cause the computing device perform operations comprising:
determining an I/O performance profile for a storage device, the I/O performance profile determined based on one or more performance metrics for the storage device;
based on the I/O performance profile and a characteristic I/O performance profile for a representative group of storage devices having common characteristics with the storage device, determining that a probability that the storage device will enter a marginal performance state exceeds a predetermined threshold; and
redirecting selected I/O requests designated for the storage device to another storage device while the probability that the storage device will enter the marginal performance state exceeds the predetermined threshold.

Example Clause H, the computing device of Example Clause G, wherein the another storage device is selected from a group of storage devices that are configured to implement a fault resiliency function, wherein the storage device is part of the group of storage devices.

Example Clause I, the computing device of Example Clause G or Example Clause H, wherein the probability is determined in part on a difference between the I/O performance profile for the storage device and the characteristic I/O performance profile for the representative group of storage devices.

Example Clause J, the computing device of Example Clauses G through I, wherein the another storage device is selected based on a performance profile for the another storage device indicating that the another storage device is not in the marginal performance state.

Example Clause K, the computing device of Example Clauses G through J, wherein the selected I/O requests are redirected for a time period based on a characteristic recovery time for the storage device, wherein the characteristic recovery time that is determined based on a historical record of recovery times for the representative group of storage devices.

Example Clause L, the computing device of any one of Example Clauses G through K, wherein the fault resiliency function is mirroring or erasure coding.

Example Clause M, the computing device of any one of Example Clauses G through L, wherein the redirecting selected I/O requests is further based on one or more of bandwidth criteria, device self-reporting, and quality of service factors.

Example Clause N, the computing device of any one of Example Clause G through M, wherein the probability is determined in part on a time-based distribution of latencies for I/O operations associated with the storage device.

Example Clause O, the computing device of any one of Example Clauses G through N, wherein the probability is determined in part on latencies for I/O operations associated with the storage device that have exceeded a threshold value.

Example Clause P, the computing device of any one of Example Clauses G through O, further comprising computer-readable instructions stored thereupon which, when executed by the one or more processors, cause the computing device perform operations comprising:
terminating the redirection of selected I/O requests when it is determined that the storage device is no longer in the marginal performance state.

Example Clause Q, the computing device of any one of Example Clauses G through P, wherein the determining that the storage device is no longer in the marginal performance state is based on determining that latencies for I/O operations associated with the storage device have not exceeded a predetermined threshold for a specified time period.

Example Clause R, a computer-readable medium having encoded thereon computer-executable instructions that, when executed, cause one or more processing units of a computing device to execute a method comprising:

collecting performance data for input/output operations executed at a storage device of a group of storage devices that are configured to implement a fault resiliency mechanism;

based on the collected performance data, determining a time-based I/O performance profile for the storage device;

determining a characteristic time-based I/O performance profile for a representative group of storage devices having common characteristics with the storage device;

determining that a difference between the time-based I/O performance profile for the storage device and the characteristic time-based I/O performance profile exceeds a predetermined deviance threshold that is indicative of the storage device entering a marginal performance state; and in response to determining that the difference exceeds the predetermined deviance threshold, redirecting selected I/O requests designated for the storage device to another device of the group of storage devices for a timeout period that is determined based on a characteristic recovery time for the storage device.

Example Clause S, the computer-readable medium of Example R, wherein the performance metrics comprise latencies for I/O operations that were executed at the storage devices.

Example Clause T, the computer-readable medium of any one of Example Clauses R through S, wherein the performance profile comprises a distribution of numbers of metrics that fell within each of a plurality of metric ranges.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for predicting a marginal performance state of a storage device, the method comprising:

collecting performance data for input/output operations executed at a storage device of a group of storage devices that are configured to implement a fault resiliency function;

based on the collected performance data, determining a time-based input/output (I/O) performance profile for the storage device;

determining a characteristic time-based I/O performance profile for a representative group of storage devices having common characteristics with the storage device;

determining that a difference between the time-based I/O performance profile for the storage device and the characteristic time-based I/O performance profile exceeds a predetermined deviance threshold that is indicative of the storage device entering a marginal performance state; and in response to determining that the difference exceeds the predetermined deviance threshold, redirecting selected I/O requests designated for the storage device to another device of the group of storage devices for a timeout period that is determined based on a characteristic recovery time for the storage device.

2. The computer-implemented method of claim 1, wherein the group of storage devices is an erasure coding group or a group of mirrored devices.

3. The computer-implemented method of claim 1, wherein the collected performance data comprises latencies for I/O operations that were executed at the storage device.

4. The computer-implemented method of claim 1, wherein the time-based I/O performance profile comprises a distribution of numbers of metrics that fell within each of a plurality of metric ranges.

5. The computer-implemented method of claim 1, wherein the time-based I/O performance profile comprises a total number of I/O operations where associated latencies were greater than a threshold.

6. The computer-implemented method of claim 5, wherein the redirecting selected I/O requests is further based on one or more of bandwidth criteria, device self-reporting, and quality of service factors.

7. A computing device comprising:
one or more processors;
a memory in communication with the one or more processors, the memory having computer-readable instructions stored thereupon which, when executed by the one or more processors, cause the computing device perform operations comprising:
determining an I/O performance profile for a storage device, the I/O performance profile determined based on one or more performance metrics for the storage device;
based on the I/O performance profile and a characteristic I/O performance profile for a representative group of storage devices having common characteristics with the storage device, determining that a probability that the storage device will enter a marginal performance state exceeds a predetermined threshold; and
redirecting selected I/O requests designated for the storage device to another storage device while the probability that the storage device will enter the marginal performance state exceeds the predetermined threshold.

8. The computing device of claim 7, wherein the another storage device is selected from a group of storage devices that are configured to implement a fault resiliency function, wherein the storage device is part of the group of storage devices.

9. The computing device of claim 8, wherein the probability is determined in part on a difference between the I/O performance profile for the storage device and the characteristic I/O performance profile for the representative group of storage devices.

10. The computing device of claim 8, wherein the another storage device is selected based on a performance profile for the another storage device indicating that the another storage device is not in the marginal performance state.

11. The computing device of claim 10, wherein the fault resiliency function is mirroring or erasure coding.

12. The computing device of claim 10, wherein the redirecting selected I/O requests is further based on one or more of bandwidth criteria, device self-reporting, and quality of service factors.

13. The computing device of claim 7, wherein the selected I/O requests are redirected for a time period based on a characteristic recovery time for the storage device, wherein the characteristic recovery time that is determined based on a historical record of recovery times for the representative group of storage devices.

14. The computing device of claim 7, wherein the probability is determined in part on a time-based distribution of latencies for I/O operations associated with the storage device.

15. The computing device of claim 7, wherein the probability is determined in part on latencies for I/O operations associated with the storage device that have exceeded a threshold value.

16. The computing device of claim 7, further comprising computer-readable instructions stored thereupon which, when executed by the one or more processors, cause the computing device perform operations comprising:
terminating the redirection of selected I/O requests when it is determined that the storage device is no longer in the marginal performance state.

17. The computing device of claim 16, wherein the determining that the storage device is no longer in the marginal performance state is based on determining that latencies for I/O operations associated with the storage device have not exceeded a predetermined threshold for a specified time period.

18. A non-transitory computer-readable medium having encoded thereon computer-executable instructions that, when executed, cause one or more processing units of a computing device to execute a method comprising:
collecting performance data for input/output operations executed at a storage device of a group of storage devices that are configured to implement a fault resiliency mechanism;
based on the collected performance data, determining a time-based I/O performance profile for the storage device;
determining a characteristic time-based I/O performance profile for a representative group of storage devices having common characteristics with the storage device;
determining that a difference between the time-based I/O performance profile for the storage device and the characteristic time-based I/O performance profile exceeds a predetermined deviance threshold that is indicative of the storage device entering a marginal performance state; and
in response to determining that the difference exceeds the predetermined deviance threshold, redirecting selected I/O requests designated for the storage device to another device of the group of storage devices for a timeout period that is determined based on a characteristic recovery time for the storage device.

19. The non-transitory computer-readable medium of claim 18, further comprising:
wherein the performance data comprise latencies for I/O operations that were executed at the storage device.

20. The non-transitory computer-readable medium of claim 18, wherein the time-based I/O performance profile comprises a distribution of numbers of metrics that fell within each of a plurality of metric ranges.

* * * * *